United States Statutory Invention Registration [19]

Geeter

[11] Reg. Number: H342

[43] Published: Oct. 6, 1987

[54] APPARATUS TO IMPROVE ACCURACY OF WEAPONS THROUGH BARREL FLEXURE

[75] Inventor: Eugene Geeter, Orange, N.J.

[73] Assignee: The United States of America as represented by the Secretary of the Army, Washington, D.C.

[21] Appl. No.: 2,476

[22] Filed: Jan. 12, 1987

Related U.S. Application Data

[63] Continuation-in-part of Ser. No. 870,214, May 29, 1986, Pat. No. H202.

[51] Int. Cl.[4] ..... F41F 17/00; F41F 21/00

[52] U.S. Cl. ..... 89/14.05; 89/41.02; 89/41.16; 89/191.01

*Primary Examiner*—Stephen C. Bentley

*Attorney, Agent, or Firm*—Anthony T. Lane; Harold H. Card, Jr.; Michael C. Sachs

[57] ABSTRACT

A method and apparatus is shown for programming near perfect accuracy for each shot in a rapid burst machine gun sequence which heretofore was not known to be attainable. Because of vibrations from many sources in the barrel, which are predictable and repeatable, it is impossible for each shot to land directly, except for the first one before vibrations really begin. Each succeeding shot (a different path) has its own signature. In this invention, the barrel is precision bent (flexed) at each instance of the sequence, to compensate for the known vibrations, as each shot travels the barrel, to get a straight shot every time.

An adapter is mounted on a gun barrel near its free end. The adapter contains spaced-apart fulcrums with an actuator between the fulcrums for bending or flexing the barrel with respect to the fulcrums. This bends the barrel, causing the muzzle of the barrel to move and thus re-air the barrel independently of a mount which carries the barrel. The adapter can be used in a rapid fire weapon. The flexing condition of the barrel at each round of a burst of fire is recorded and then used to supply forces to the barrel during a subsequent burst of fire. The applied forces compensate for the uncontrolled flexing of the barrel to increase accuracy.

9 Claims, 12 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS TO IMPROVE ACCURACY OF WEAPONS THROUGH BARREL FLEXURE

GOVERNMENTAL INTEREST

The invention described herein may be manufactured, used, and licensed by or for the Government for Governmental purposes without the payment to me of any royalties thereon.

CONTINUING DATA

This application is a continuation-in-part of my application Ser. No. 870,214, filed May 29, 1986, now S.I.R. H202 entitled "Barrel Flexure Control System" by Eugene Geeter, the entire file of which is herewith incorporated by reference as though fully set forth here at length.

BACKGROUND AND FIELD OF THE INVENTION

I have discovered that a weapon's gun barrel can be flexed a small number of degrees and yet the weapon can still be fired without damaging it, or damaging the inside of its barrel surprisingly. One particular purpose of such flexing is to adjust the aim of the weapon that is when the muzzle of a rifle is deflected a few degrees from true straight it can change and be used to correct the path of the bullet. The flexing is only a temporary bending, it is preferred to have the flexing reversed after each instantaneous flex. While the concept might seem impractical at first for a variety of reasons, and might lead to damage or harm nonetheless I have experimented and found otherwise, contrary to popular belief. I have flexed a rifle muzzle (nondeformably) up to five degrees for aiming purposes and left it that way before the bullet was fired and yet found no noticeable scoring to the inside of the barrel and no damage noticeable by firing the weapon. There is no reason why a weapon cannot be used in this way apparent to me so long as the flexing is a small number of degrees. What I have accomplished by this is a manner to impart a desired correction to the aim of a bullet, according to the amount of deflection I selectively apply on the barrel with my apparatus for this purpose, disclosed herein. This leaves one with another method for aiming a weapon such as a rifle, a machine gun, or even of larger cannons if enough force were applied, without having to aim the whole weapon, as is done now. Moving the whole weapon's position to aim as is conventional in fire control apparatus, requires more movement of weight and force over a short period of time and probably yields less accuracy than by reflexing the muzzle, which is believed simpler, more accurate, moves far less bulk, and has a shorter response time for effecting an aiming. Also, when the weapon is hand held such as a machine gun, a fire control system for aiming second and subsequent shots in a burst, would be impossible to have, so my method is the only way known to me to aim subsequent shots automatically with improved accuracy. Previously, attention was focused on improving the aim at the breech and fire control areas, in the continuing quest for aiming accuracy. No one to my knowledge has ever attempted to improve aim by flexing the muzzle slightly, thinking no doubt that damage might result or that it would be impractical to accomplish. However, I have conceived this concept and developed apparatus to carry it out. It must be remembered that, in my apparatus, the bend of the muzzle is made before the expected shot, and locked in that position until after the shot has passed. It is also however, conceivable to flex the muzzle at all times with my apparatus, in a continuous manner to continuously correct the muzzles's aiming angle for fire-on-the-move stabilization. Nonetheless, the barrel centering occurs naturally and the barrel springs back to true straight whenever the flexing forces are withdrawn, it is in a sense like a spring device. Even if it did not completely return, with my apparatus a corrective flex might be applied to overcome its effect anyway.

One possible application for my concept, and apparatus, involves correction of an automatic cannon having internal errors, or an automatic assault rifle. Assuming a ten round sequence of firing, for instance, it is known that each bullet falls at a different spot on the target from where the very first one lands, despite the shooter's best efforts to continue to aim the rifle at the same spot where the first round was fired. Even if the weapon had been locked in a vise grip for example to absolutely maintain the positional aim without question, each of the succeeding nine bullets would still fall in a different spot from the first anyway, and all different spots from one another; all the locations are predictable and repeat themselves. Every time one fires the ten round sequence for example, one gets the same signature. This phenomenon is because the muzzle oscillates after the first kick-back or muzzle climb action, and for other reasons as well, in the time interval between the rounds, so that the muzzle cannot settle down from vibrating, in the time for next round. Therefore, it is impossible for the shooter to have identical accuracy on all ten shots no matter how well he might aim. With my discovery however, I have invented a deflection apparatus to flex the muzzle sequentially and appropriately, before each and every shot to compensate for the expected error(s) in aiming caused by muzzle oscillations off of true straight. Each correction is of course different, both in the X-axis and Y-axis directions (assuming the weapon is aimed in the Z-axis direction). I have devised a number of mechanical means to accomplish the requisite deflections, which can operate during the short times permitted, in order to have the proper deflections applied and locked in place before each next shot arrives. I have very successfully tested a number of embodiments, and demonstrated that the concept works in practice.

Another possible application for my concept and apparatus is with the large cannons such as aboard ship, which fire large projectiles, or like applications. Analogous to the rifle, it is possible to aim the "big guns" also by flexing the barrel muzzle. This accomplishes another last-minute aiming of the fired projectile if desired to be in addition to the fire control, for example, or to replace it entirely. Conventionally, adjustment to such cannons are made at their bases by large mechanical means, by moving the entire cannon into proper aim, and usually before firing. If there were a need for a split-second, small angle re-aiming, which could not be accomplished by such servomechanisms at the base areas of the cannons in a fraction of a second if needed, this could be corrected by my invention (at small angles of correction), by a flexing of the cannon's muzzle, using the same principles of this invention, and even in the time the projectile travels up the cannon barrel after it has left the breech it can still be corrected. Of course, the pressures needed to bend a cannon are extremely large compared to those needed to bend a mere rifle. Nonetheless, there is much less weight to move in the split second involved using my method than by the conventional method of moving the entire cannon for aim. My method could be used to "fine tune" the aim of this weapon at the very last moment, as under computer control for example; this could be coordinated with other fire control methods on the cannon, for instance. It must be remembered of course that with my invention, one does not expect to flex beyond the elastic limit of the barrel, so there will be no deformation of the barrel shape. However it is still theoretically possible to correct for the effects of that with my invention, as to aiming. While with the conventional methods it might still be possible to re-aim a large gun mounted on servos at the last moment by moving the entire gun, yet for a rifle it is not possible without this invention because it is hand-held and its aim is taken by a human operator, not by servos. Thus, the value of my apparatus on a hand-held weapon is especially apparent.

With this invention, one convenient way to flex the barrel is to utilize a brace means, providing two fulcrums, where the force could be applied between the two fulcrum points (such as 40 and 42 in FIG. 2). A servomechanism (such as 14 there) can be used, electrical, mechanical, hydraulic, pneumatic types, etc. to apply the force. In one experiment I used type a MOOG electrohydraulic servo-actuator on a 20 MM, M—139 Automatic Cannon setup. One brace means plus servo setup is needed for correction in each of the X-axis and Y-axis directions, though it is possible to build one brace means to accomodate both directions, a hollow cylindrical setup for example could be used as a brace. Before each of the sequential shots was fired, corrective deflections, both X and Y, were applied, as based upon my previously observed measurements as to these errors. The device responds electrically, very rapidly to orders for desired deflection positions. I was able to get virtually direct hits, all ten times, in such a case by using my apparatus. It is possible, and desired, to build the servos, brace and etc., setup into a miniaturized collar weighing under a pound and occupying little space, which could be made to simply slip over the end of the muzzle and locked in place. The gun plus servos, would have to be calibrated at the time of manufacture, to ascertain the right deflections needed for each instant of the ten round sequence, for example and thus to program it into my apparatus to go through that corrective sequence of ten. It is possible to have the proper sequence programmed into a memory device, if electrical servos are utilized, however an all mechanical setup, for the programming, is contemplated. A cam shaft or cam type apparatus is envisioned to take the flexing through the proper sequence at each step of the ten round firing, automatically just as the weapon fires and powered by the gun itself, using force of gas pressures generated within the gun upon each firing as the power for doing the flexing (see FIG. 10, e.g.). While the electrical programming is attractive since it provides for easy calibration and changes in programming, a mechanical device requiring no electrical power is preferred for the field since it requires no battery or the like. Also envisioned for use in my apparatus are hydraulic displacement devices which are either electrically, or gas operated and programmed into a flexing sequence.

My invention also finds application in cases wherever such an extreme precision aim is required; or whether the possibility of a last split-second refinement to the aim would be so sufficiently desirable that one would be willing to tolerate the necessary extra equipment according to this invention to accomplish it. Possibly in aerial combat, the flexing-type aim correction for the automatic, burst-fire guns might be usable, as it would insure better aim for each and every shot, and the weight of the add-on equipment could be tolerated. In certain "Star-Wars" type long distance shots, where every little bit of further angular accuracy is desirable owing to the large target distances magnifying the error, this invention could be very useful. The end of the aiming device, of whatever type weapon is involved in such systems, could be flexed and deflected using my idea.

The programming of the deflection sequence, or original calibration, might be done by use of lasers to find the target, for instance, and then electrooptically measuring where each bullet in a sequence actually falls, and then electronically correcting for it using my flexing concept and apparatus to make the compensations. The calibration therefore could thus be run in less than milliseconds, electronically.

DESCRIPTION OF THE PREFERRED EMBODIMENTS

Figure 1:
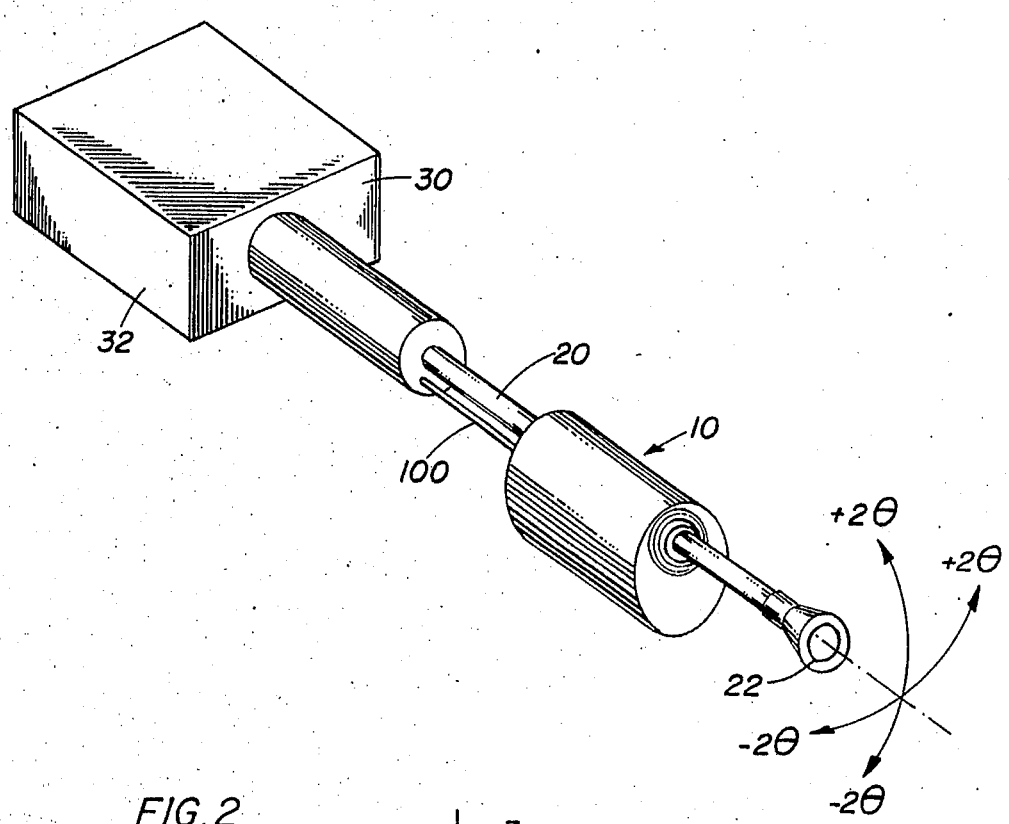
FIG. 1 is a perspective view of an automatic cannon carrying the barrel adaptor of the present invention.

Referring to the drawings in particular, the invention embodied in FIG. 1 comprises a barrel flexure control adaptor generally designated 10 that is mounted on the free end of a barrel 20 having a muzzle 22 from which projectiles are fired. Barrel 20 is connected to a known rapid fire weapon 30, such as the Oerilikon 20 mm automatic single barrel cannon, designated the M139. This weapon is capable of firing 1,000 shots per minute. Weapon 30 has a mounting 32 which can be mounted at a fixed location or on conventional aiming equipment for aiming barrel 20.

Actuators, to be described in greater detail later, are provided in adaptor 10 for flexing barrel 20 so that it can swing by selected angles $\pm 2\ \theta$, in both the vertical and the horizontal axes.

Figure 2:
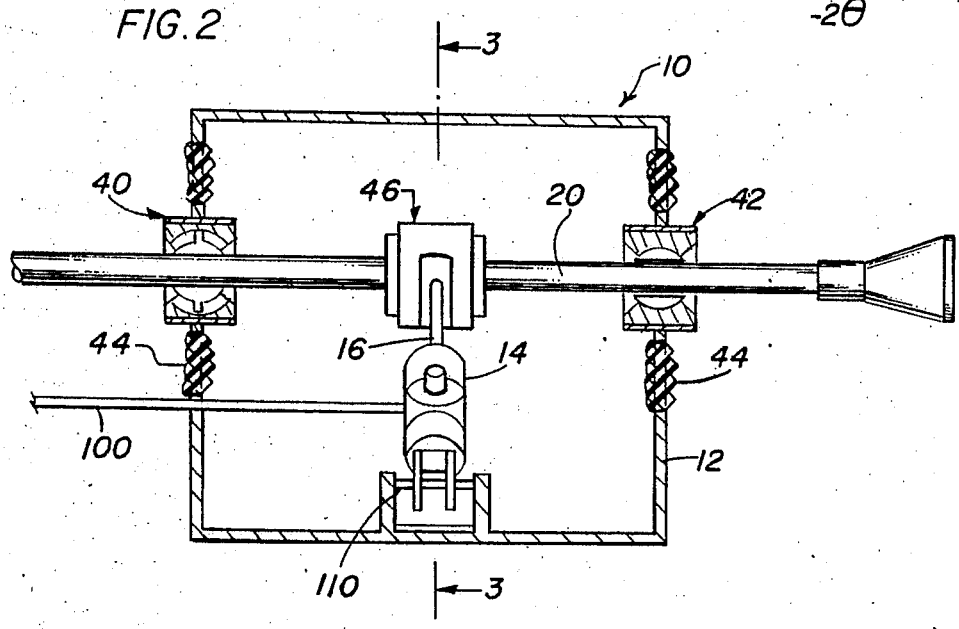
FIG. 2 is a sectional view partially in elevation showing the adaptor and its inner structure.
Figure 3:
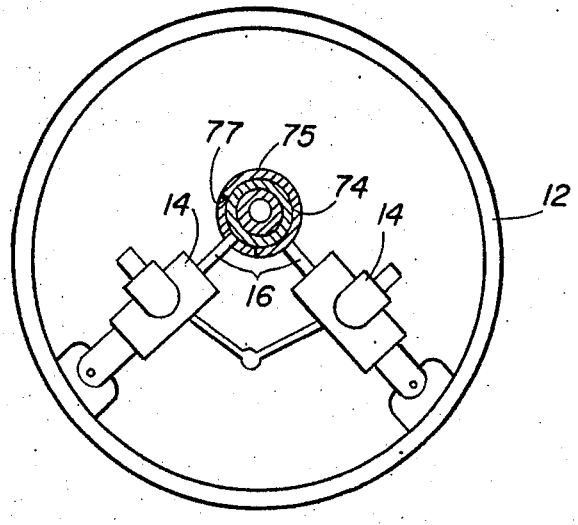
FIG. 3 is a sectional view, partly in elevation, taken along lines 3—3 of FIG. 2.

As shown in FIG. 2, adaptor 10 comprises a cylindrical enclosure 12 which defines an inner space containing two actuators 14, shown also in FIG. 3. Each of the actuators includes a hydraulic or pneumatic cylinder and piston with a piston rod 16 extending out of the cylinder. Piston rod 16 of actuators 14 are operatively connected at a central point in enclosure 12 to barrel 20.

Enclosure 12 also resiliently carries a first bearing 40 and a second bearing 42. Bearings 40 and 42 act as fulcrums about which barrel 20 pivots when a force is applied to the barrel by piston rod 16.

To permit relative movement between the barrel 20 and the enclosure 12, bellows or other semi-rigid support structures 44 are used to separate the bearings 40, 42 from the enclosure 12.

It is noted that enclosure 12 may be replaced by any other support which holds the relative position between bearings 40 and 42 and the actuators 14. The support need not enclose the actuators.

Piston rods 16 are engaged with barrel 20 by a third bearing 46.

Figure 5:
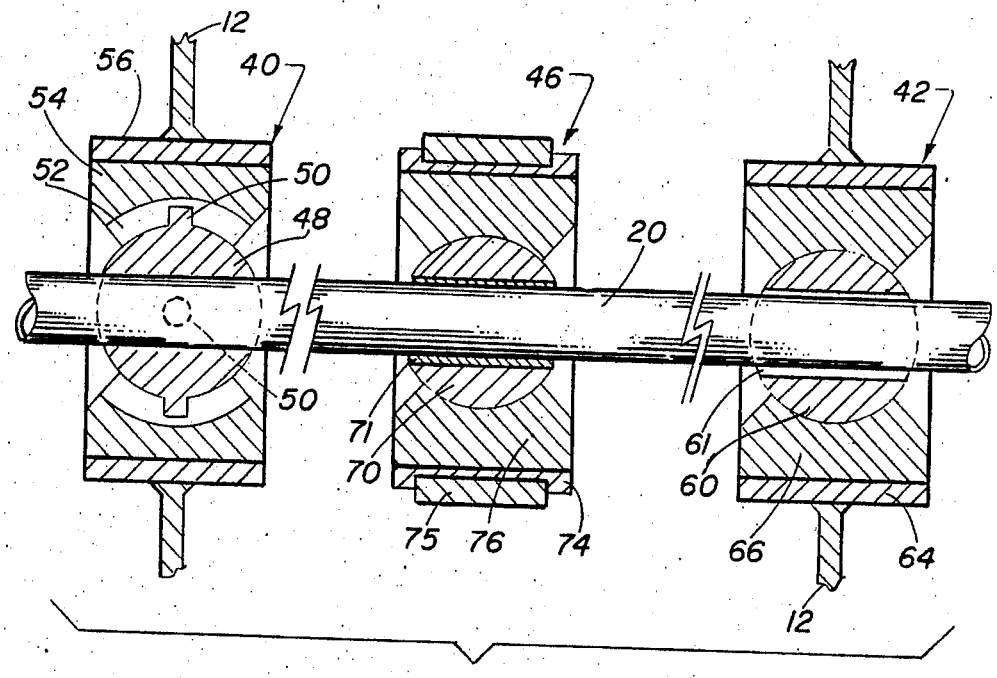
FIG. 5 is a fragmentary sectional view showing the bearing arrangement for the barrel in accordance with the present invention.

As shown in FIG. 5, bearing 14 includes an inner spherical member 48 which is fixed to barrel 20. Inner spherical member 48 includes four outwardly extending posts 50 (two of which are shown in FIG. 5 in solid line and one of which is shown in dotted line.) Posts 50 ride in slots 52 which are milled into outer spherical member 54. A support ring 56 carries outer spherical member 54 and mounted to the enclosure 12, or more correctly the bellows 44. Bearing 40 thus forms a fixed fulcrum for barrel 20 which permits pivoting of the barrel with respect to bearing 40 but which precludes rotation and longitudinal movement with respect to the barrel. Inner spherical member 48 rolls in outer spherical member 54 but does not slide or rotate with respect to the outer spherical member.

The second bearing 42 includes an inner spherical member 60 which carries an inner linear bearing 61 which may simply comprise a sliding sleeve made of low friction material. Inner spherical member 60 rides in an outer spherical member 66 which is supported by a support ring 64 connected to enclosure 12. Barrel 20 can thus rotate and axially slide with respect to bearing 42.

The third bearing 46 includes an inner spherical member 70 having a linear bearing 71 in contact with barrel 20. Bearing 71 is the same as bearing 61 and permits linear sliding movement between bearing 46 and barrel 20. Spherical member 70 rotates in an outer spherical member 66 which is connected to a first support ring 74. A second support ring 75 rides in an annular recess on the outer surface of ring 74. Rings 74, 75 can rotate with respect to each other and with respect to barrel 20. In the same manner, barrel 20 can rotate with respect to spherical member 60 and this with respect to second bearing 42.

As shown in FIG. 3, one of the piston rods 16 is connected to the first ring 74 and the other piston rod 16 is connected to the second outer ring 75. To permit relative rotation between rings 74 and 75, ring 74 is provided with a slot 77 through which the piston rod 16 that is connected to inner ring 74 extends.

Figure 4:
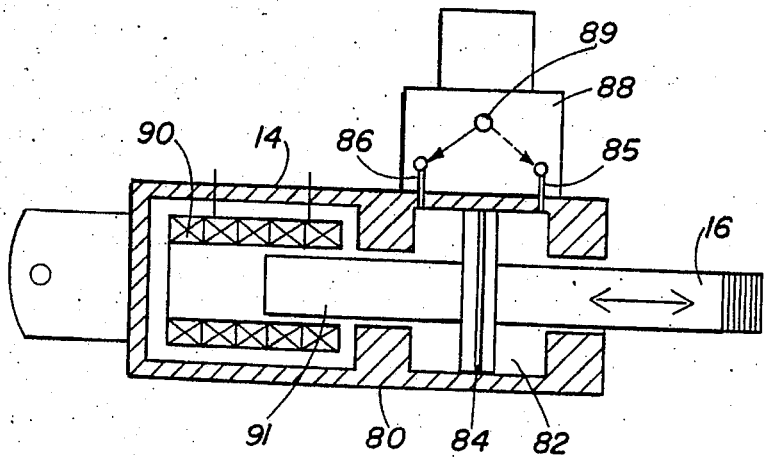
FIG. 4 is a sectional, partly schematic illustration, on an enlarged scale, showing one of the actuators for flexing the barrel.

FIG. 4 shows additional details of one of the actuators 14.

Actuator 14 includes a cylinder housing 80 which contains a cylinder space 82 which receives a piston 84 connected to piston rod 16. Hydraulic or pneumatic ports 85 and 86 are connected to opposite ends of cylinder 82 on opposite sides of piston 84, and to a fast-acting servo-valve 88 which is of known design. Servo-valve 88 receives pressure from a hydraulic or pneumatic pressure port 89 and can selectively supply that pressure to ports 85 or 86. Valve 88 can thus be actuated to either cause piston rod 16 to withdraw into cylinder 80 or to be pushed out of cylinder 80. This permits barrel 20 to be flexed both outwardly away from the actuators and inwardly toward the actuators.

A linear variable differential transformer 90 is also provided in cylinder 80 and interacts with an axial projection 91 of piston rod 16 to provide a signal which is indicative of the position of piston rod 16. A signal from transformer 90 can thus be used as an indication of the position of barrel 20 with respect to each actuator. In this way, with valve 88 in a neutral position supplying no pressurized fluid to cylinder space 82, transformer 90 can be used to sense the meandering position of the barrel 20 as a burst of projectiles is fired from the barrel.

Figure 6:
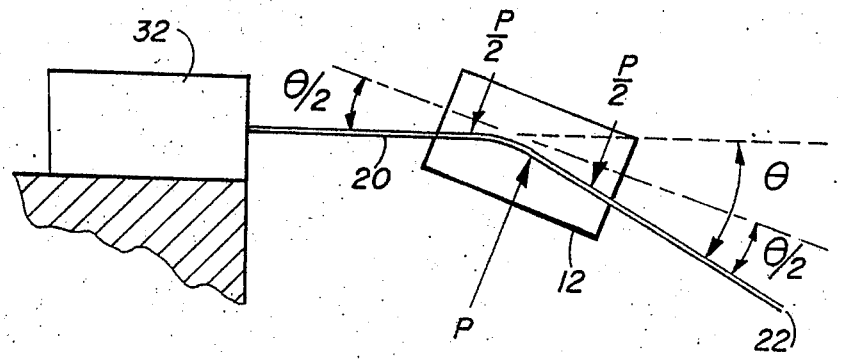
FIG. 6 is a schematic explanatory illustration showing the forces and flexing angles of the barrel.

FIG. 6 shows how a force P can be applied to the barrel between the fulcrum bearing which each absorbs a force P/2, to bend or flex the barrel. Each end of the barrel is flexed an angle $\theta/2$. In this way the muzzle of the barrel is flexed total angle $\theta$ with respect to the base of the weapon which is held at a fixed location.

Figure 7:
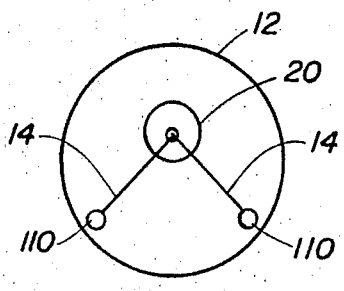
FIG. 7 is a schematic sectional view showing the position of the inventive adaptor and the barrel when it is not flexed.

By actuating the servo-valve 88 of each actuator 14, the barrel can be bent, within limits, to any desired orientation to move the muzzle around. FIG. 7 shows barrel 20 in a neutral position with neither actuator activated.

Figure 8:
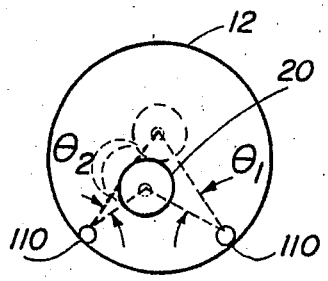
FIG. 8 is a view similar to FIG. 7 showing how the barrel can be flexed in two dimensions using two actuators according to the present invention.

FIG. 8 shows how with the actuator on the left actuated to a large extent and the actuator on the right actuated to a lesser extent, barrel 20 can be deflected so that the actuators form angles $\theta_1$ and $\theta_2$ with respect to their original or neutral positions.

Actuators 14 may be provided with pneumatic or hydraulic pressure over a pressure line 100. Pressure line 100 may be connected to an external source of pressure or may even be connected to an accumulator within the weapon 30 which is connected to the barrel for receiving and accumulating the pressure of expanding gasses produced by the projectiles themselves. Other pressure can be available from the recoil forces of barrel 20 when it is fired. In this way actuators 14 can be powered by the weapon itself and no external power supply is necessary.

Any other power supply can be used as actuators 14 for flexing the barrel 20.

It is also noted that each actuator 14 is pivotally mounted at a pivot connection 110 to the enclosure 12. This permits pivoting of the actuators with respect to the enclosure.

One mode of operation for the present invention is to first fire a burst of a selected number of projectiles from the barrel. In actual experiments that were conducted to verify the usefulness of the invention, five projectiles were fired in rapid succession. This produced a pattern at the target where the first projectile struck near the desired location on the target while the subsequent projectiles landed at increasing distances from that location. Due to uncontrolled flexing of the barrel 20, the other projectile also moved laterally. Each burst of fire roughly reproduced the same pattern. The pattern was recorded using transformer 90 and a cassette tape was made of the recorded signals. These were fed back through an electrical control mechanism (not shown) to actuate the actuators 14 and thus counteract the flexing for each round in the burst. In this way the barrel was flexed to compensate for the uncontrolled bending and a more accurate pattern was achieved.

The present invention can also be used to aim the muzzle 22 of the barrel 20 by applying appropriate signals to the servo-valves 88 of the actuators.

Figure 9:
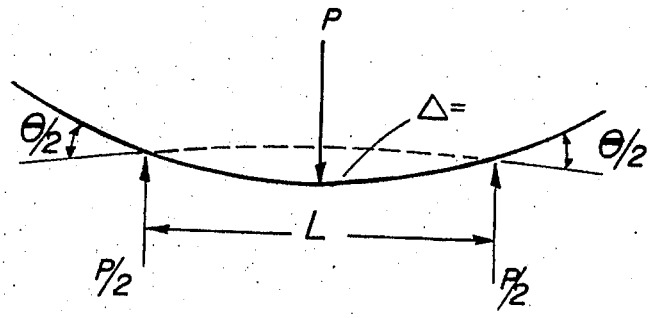
FIG. 9 is an explanatory illustration showing a flexed barrel.

Referring to FIG. 9, with length L between the fulcrums being chosen to be 23 inches, force P was applied by one actuator at the midpoint or at 11.5 inches from each fulcrum. The 20 mm barrel used had an inside diameter of 0.83 inches and an outside diameter of 1.57 inches. For a desired 0.5 inch deflection, Δ, a force of 16.261 pounds was found necessary. The barrel is made of steel alloy $E=3\times10^7$. The force necessarily was calculated as a function of the moment of inertia for the barrel.

Figure 10:
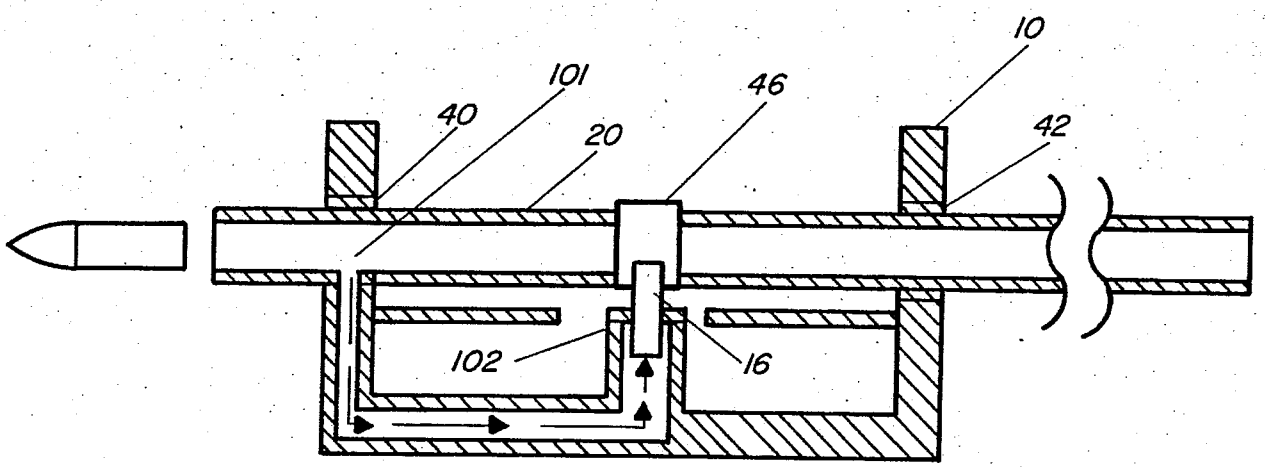
FIG. 10 shows a deflector system powered by gas pressure within the weapon itself, as shown.

In FIG. 10, gas is diverted from a small hole in the barrel located at location 101, to power an exemplary pneumatic-hydraulic means 102 which can deflect the barrel appropriately for the next shot. On the first shot, no adjustment is made and indeed there is no gas pressure yet available for such correction, anyway. The second and subsequent shots are needed to be corrected because of oscillations as was explained previously; the first shot is originally aimed right on target by the shooter. Gas pressure behind the bullet escapes through the said hole, when the bullet passes the hole, but has not yet left the barrel muzzle, in this particular embodiment as an example. At this point, the means 102 quickly flexes the barrel in preparation for the next shot. After the bullet leaves the muzzle, gas pressure is lost. However by now the barrel is already locked in place all properly flexed in preparation for the next shot. Thus, the power to operate the proposed displacements means may come from the gun itself, and it is a preferred way.

Figure 11:
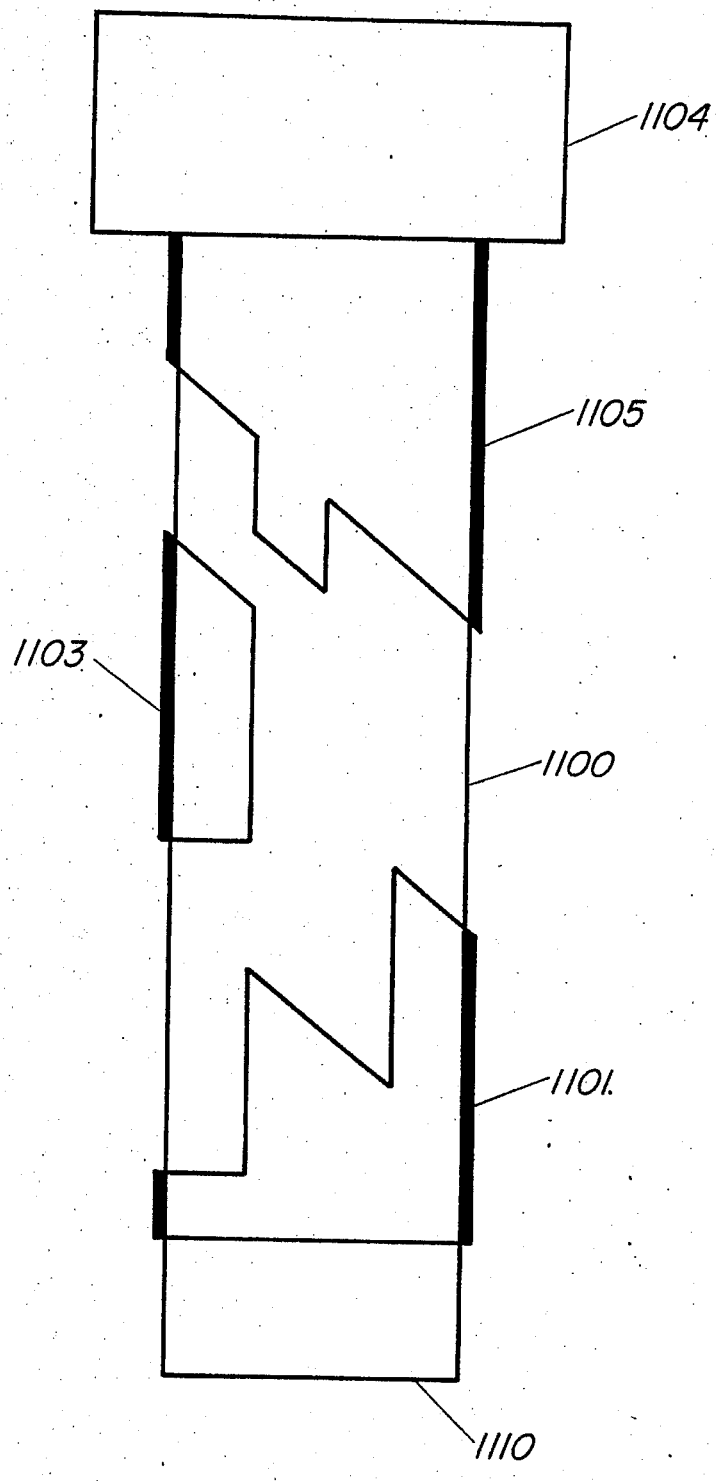
FIG. 11 shows a mechanical gas powered deflection means whereby various lengths of deflections may be programmed to occur in sequence.

A mechanical device which could change its displacement in a programmed sequence is shown in FIG. 11, though many other devices and arrangements are of course possible. Here, this device has two positions possible, for the sake of illustration called position-0, position-1, (the device returns back to position-0 after going through the cycles 0-1). One may think of a ballpoint pen as an example, having two or three possible, fixed displacement positions, retracted or engaged, and locked positions, e.g. This would be used in place of element 102 in FIG. 10 for example if the two fixed positions 0 and 1 were all that were needed.

Figure 12:
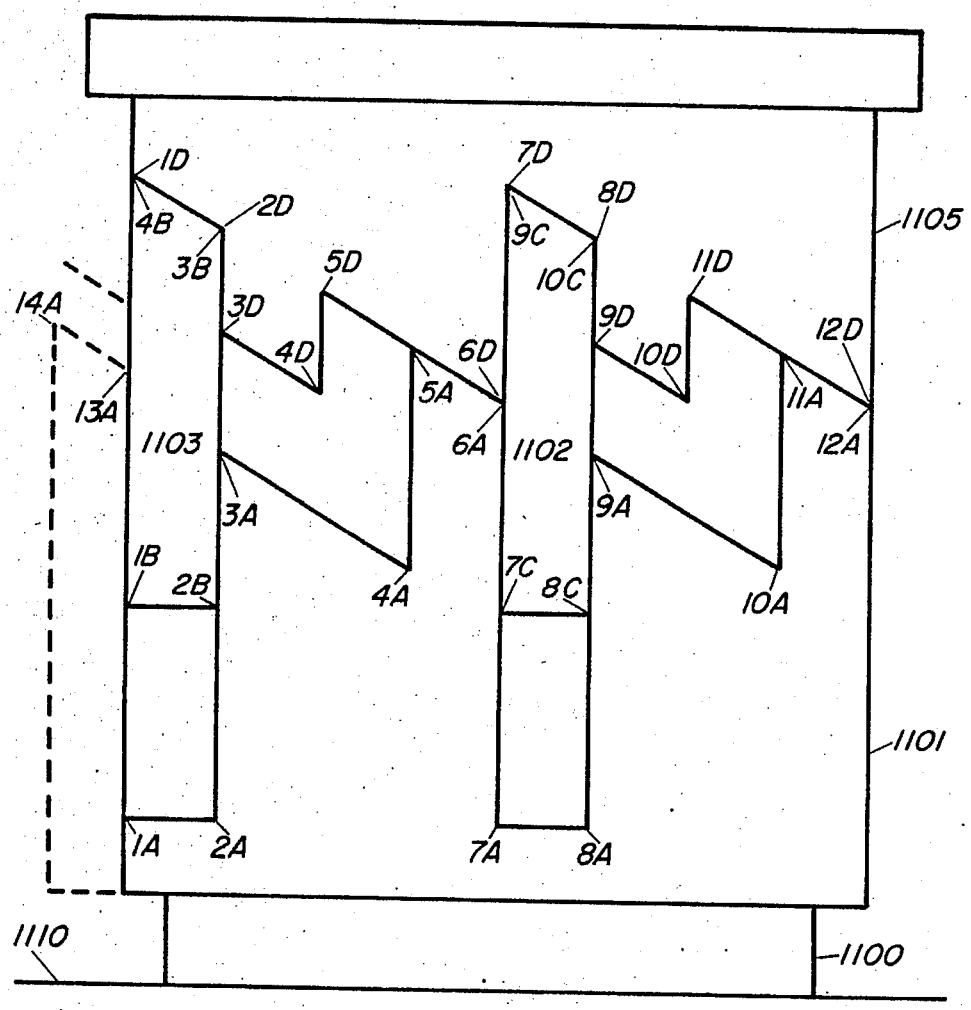
FIG. 12 shows engagement of teeth in the mechanical means of FIG. 11, as the mechanism goes through its programmed steps.

In FIG. 11, pressure is applied, for example, behind lower collar 1101 causing it to move up the stem for example, thereby causing the plain crown 1104 to be subsequently displaced and then locked in a different height relative to the base of the apparatus. The displacements will be locked, and not changed in sequence, until each time the loose collar 1101 is pumped forward up the stem 1100, i.e., by air pressure or hydraulic pressure, for instance. The loose collar 1101 has a variable tooth pattern on its upper end which interacts with an engaging tooth pattern on lower end of plain collar 1105 and stationary pieces 1102 and 1103 which also have upper tooth patterns, and which are firmly attached to the stem 1100. Plain collar 1105 locks the crown, which rides above it, into the different height position abovementioned. It is envisioned that the item of FIG. 11 might be used as a displacement means in FIG. 2 for example in place of actuator 14 rested within the frame 10, with crown 1104 against the gun barrel 20, for example, or the reverse position if desired, to provide select programmed displacements of the barrel; the spring action of the barrel keeps the device and its parts in place. FIG. 12 illustrates possible shape of, engagement and interaction of teeth for the collars of FIG. 11, in operation. The cylindrical collars here are illustrated in a flat position, as if unrolled, though in practice they are kept cylindrically shapes as in FIG. 11. With the position originally shown in FIG. 12 at rest, as collar 1101 is pushed up stem 1100 until point 6A on collar 1101 (also 6D on collar 1105 which rides with it) equates with point 9C on stationary piece 1102, then collar 1105 slides down with its line 5D-6D sliding down line 9C-10C on piece 1102, until point 5D on 1105 now contacts with point 9C on 1102. The piece has moved to the right almost ¼ cycle (on the cylinder 1105 this is counterclockwise rotation approximately 90°), and also been raised up relative to the base-line (the crown 1104 is raised up too because it rides 1105), because point 5D (which is lower on 1105 than 7D) now is at 9C; this makes 1105 higher. This is a second position of displacement height for this device measured from top of crown down to base 1110. As an inbetween step, corner 5D catches corner 5A on 1101 before 1101 is retracted back down again, then corner 5D catches corner 9C as mentioned. That provides another possible displacement height of crown top as compared to base, until the collar 1101 is retracted and 1105 completes its slide to 5D catching 9C. This displacement is different from, and actually higher than the said second position, by some ½ inch according as shown here as a mere example. Now, line 5A-6A will engage line 3D-4D if collar 1101 is again pushed, and high enough up the stem. If pushed yet higher, then 4D will push up over 9C and 1105 can again slide, this time line 3D-4D against 9C-10C. Thus it can be seen that various displacement distances of top of crown 1104 relative to base 1110 are possible herein, if loose collar 1101 can be pushed up stem 1100 with sufficient force, repetitively. There are many possible devices for causing displacement for actuator means 14 in FIG. 2; this is only given as one example of an all mechanical displacement means which can be programmed for various positions by means of the positioning and shaping of the teeth as shown here. Other devices could be electromechanical, hydraulic, pneumatic, computer memory controlled electrical means. One commercially available device for actuator 14 which I have used is the MOOG Co. electrohydraulic servo-actuator; it is not limited to specific displacement positions, but can be set at any position by adjusting its input electrical signal. The barrel deflection is sensed by integrally mounted LVDT position sensors.

All the barrel flexure concepts I have explained here also find application to pistols as well as rifles, and other weapons having barrels. While specific embodiments of the invention have been shown and described in detail to illustrate the application of the principles of the invention, it will be understood that the invention may be embodied otherwise without departing from such principles.

What is claimed is:

1. A gun barrel adapter for a barrel having a longitudinal axis comprising:

a first bearing for engaging the barrel and for acting as a first fulcrum for flexing the barrel;

a second bearing for engaging the barrel at a location spaced along the longitudinal axis from the first bearing and for acting as a second fulcrum for flexing the barrel; and actuator means operatively connected to said first and second bearings and engaged to the barrel between said first and second bearings for applying a lateral force to the barrel for flexing the barrel whereby a position of a muzzle of the barrel can be changed.

2. An adapter according to claim 1, including a support connected to each of said first and second bearings and to each actuator, said actuator including a third bearing for engaging the barrel between said first and second bearings, said second and third bearings permitting relative rotation and sliding with respect to the barrel and said first bearing being fixed to the barrel for only permitting rotation of the barrel.

3. An adapter according to claim 2, including a second adapter extending at an angle to said first-mentioned adapter for flexing the barrel in a two-dimensional plane.

4. An adapter according to claim 1, including a support connected to said first and second bearings and to said actuator, said actuator comprising a cylinder defining a cylinder space connect to said support, a piston in said cylinder space and a piston rod extending from said cylinder space and operatively connect to the barrel between the first and second bearing, said actuator including a valve for applying pressure to said cylinder for moving said piston to flex said barrel.

5. An actuator according to claim 4, wherein said valve comprises a servo valve, and a linear sensor operatively connected to said piston rod for sensing the location of said piston rod.

6. A method of aiming a barrel comprising bending the barrel.

7. A method according to claim 6, including supporting the valve for rotation at at least one fulcrum and applying a lateral force to the barrel at a location spaced from the fulcrum to flex the barrel.

8. A method according to claim 7, including mounting the barrel at two spaced-apart fulcrums and applying the lateral force between said fulcrum.

9. A method according to claim 8, including prerecording uncontrolled flexing of the barrel at the location of the application of lateral force, during a burst of fire, and applying contrary lateral forces during a subsequent burst of fire.

* * * * *